(12) United States Patent
Boschung et al.

(10) Patent No.: US 10,138,609 B2
(45) Date of Patent: Nov. 27, 2018

(54) CONTAINER FOR SPREADER MATERIAL AND A LIQUID TANK

(71) Applicant: KÜPPER-WEISSER GMBH, Bräunlingen (DE)

(72) Inventors: Marcel Boschung, Romont (CH); Rolf Isele, Engen (DE)

(73) Assignee: KÜPPER-WEISSER GmbH, Bräunlingen (DE)

( * ) Notice: Subject to any disclaimer, the term of this patent is extended or adjusted under 35 U.S.C. 154(b) by 0 days.

(21) Appl. No.: 14/773,014

(22) PCT Filed: Feb. 26, 2014

(86) PCT No.: PCT/EP2014/053754
§ 371 (c)(1),
(2) Date: Sep. 4, 2015

(87) PCT Pub. No.: WO2014/135418
PCT Pub. Date: Sep. 12, 2014

(65) Prior Publication Data
US 2016/0010295 A1    Jan. 14, 2016

(30) Foreign Application Priority Data
Mar. 5, 2013   (EP) .................................... 13157810

(51) Int. Cl.
*E01H 10/00*   (2006.01)
*B60P 1/40*    (2006.01)
(Continued)

(52) U.S. Cl.
CPC ............. *E01H 10/007* (2013.01); *B05B 3/10* (2013.01); *B60P 1/40* (2013.01); *B65D 88/62* (2013.01);
(Continued)

(58) Field of Classification Search
CPC .......... E01C 19/12; E01C 19/20; E01C 19/21; E01H 10/007; B05B 3/10; B60P 1/40;
(Continued)

(56) References Cited

U.S. PATENT DOCUMENTS

| | | | |
|---|---|---|---|
| 3,918,604 A | 11/1975 | Kersten | |
| 5,927,617 A * | 7/1999 | Musso, Jr. | ................ B60P 1/36 239/657 |
| 2006/0078412 A1 | 4/2006 | Hagemann | |

FOREIGN PATENT DOCUMENTS

| | | |
|---|---|---|
| DE | 19733359 A1 | 2/1999 |
| DE | 102010029142 A1 | 6/2011 |

(Continued)

OTHER PUBLICATIONS

International Search Report dated Jun. 13, 2014 from corresponding International Application No. PCT/EP2014/053754; 4 pgs.

*Primary Examiner* — Christopher Kim
(74) *Attorney, Agent, or Firm* — Maier & Maier, PLLC (57) ABSTRACT

A spreader, in particular for winter service vehicles, for spreading out solid spreading materials includes a spreading-material container for receiving the solid spreading materials to be spread out, and at least one liquid tank arranged within the spreading-material container and having an at least partly flexible sheath and variable volume for receiving liquid. The spreader furthermore comprises a conveying device in a floor surface of the spreading-material container for conveying the spreading materials out of the spreading-material container. The floor surface of the spreading-material container is horizontal or almost horizontal, with the at least one liquid tank being arranged on or above the floor surface such that, upon an at least partial filling of the liquid tank, there is formed a sliding surface for (Continued)

the solid spreading materials to be spread out that is inclined toward the conveying device relative to the floor surface.

14 Claims, 8 Drawing Sheets

(51) Int. Cl.
  *B65D 88/62* (2006.01)
  *B65D 88/68* (2006.01)
  *B05B 3/10* (2006.01)
  *B65D 88/64* (2006.01)
  *B65G 69/08* (2006.01)

(52) U.S. Cl.
  CPC ............. *B65D 88/64* (2013.01); *B65D 88/68* (2013.01); *B65G 69/08* (2013.01)

(58) Field of Classification Search
  CPC ........ B65D 88/62; B65D 88/64; B65D 88/68; B65G 69/08
  USPC .......................................... 239/662, 672–680
  See application file for complete search history.

(56) References Cited

FOREIGN PATENT DOCUMENTS

| | | |
|---|---|---|
| EP | 0579311 A1 | 1/1994 |
| WO | 2006/068620 A1 | 6/2006 |

\* cited by examiner

CONTAINER FOR SPREADER MATERIAL AND A LIQUID TANK

BACKGROUND

Embodiments of this invention relate to a system, in particular for winter service vehicles, which comprises a spreader for spreading out solid spreading materials having a spreading-material container for receiving the solid spreading materials to be spread out and furthermore at least one liquid tank for arrangement within the spreading-material container. The invention furthermore relates to an accordingly adapted spreading-material container and an accordingly adapted liquid tank.

German laid-open application DE 10 2010 029 142 A1 discloses a spreader for winter service vehicles which combines three different spreading methods, namely dry-salt spreading, wet-salt spreading and pure brine spreading. Normally the brine for wet-salt spreading and pure brine spreading is located in an additional tank which is mounted for example laterally of the spreading-material container in which the spreading salt is kept. Since the additional tanks are too small for spreading pure brine over a standard spreading path of approx. 50 km, DE 10 2010 029 142 A1 proposes utilizing the spreading-material container electively as a further tank container for receiving brine. The additional tanks are retained in case wet salt is to be spread and the spreading-material container is required for receiving solid thawing materials.

Instead of employing the spreading-material container itself as a further tank container, there can alternatively be provided a liquid tank insertable into the spreading-material container, in particular in the form of a tank sack. The brine required for pure brine spreading is conveyed out of the additional tanks in the conventional manner here, and the additional tanks are automatically refilled with brine from time to time from the spreading-material container or the tank sack received therein. This is done using a pump which pumps into the additional tanks the brine received in the spreading-material container or tank sack via a hose protruding thereinto. The tank sack is formed by a flexible sheath of variable volume, so that the inner volume decreases to almost zero when the tank sack is empty, and increases accordingly when the tank sack is being filled with liquid thawing materials.

The known system is limited in its variability, however, since the additional tanks for liquid are firmly installed outside on the spreading-material container and must also be carried in the case of pure dry-salt spreading although they cannot be utilized for solid spreading materials. Even if the additional tanks were removed, a funnel shape or a downward tapering shape is necessary for complete emptying of the spreading-material container in order that the solid spreading materials can slide by gravity onto a conveying device in a floor surface of the spreading-material container and be conveyed out of the spreading-material container by means of said device. This limits the volume of the spreading-material container.

An object of the present invention is hence to propose a spreader having a spreading-material container for receiving solid spreading materials to be spread out, in combination with a liquid tank, which offers high variability with regard to the spreading-material methods at the same time as improved volume utilization.

This object is achieved by a spreader having a spreading-material container for receiving the solid spreading materials to be spread out, and at least one liquid tank for arrangement within the spreading-material container, and by an accordingly adapted spreading-material container and an accordingly adapted liquid tank, having the features of the independent claims. Claims dependent thereon state advantageous embodiments and developments of the invention.

According to the invention there is provided a spreading-material container which has a horizontal or almost horizontal floor surface and a conveying device, for example a screw conveyor, which extends within the horizontal or almost horizontal floor surface. On or above the floor surface there is arranged within the spreading-material container at least one liquid tank so as to form, upon an at least partial filling of the liquid tank, a sliding surface for the solid spreading materials to be spread out that is inclined toward the conveying device relative to the floor surface. The inclined sliding surfaces thus limit within the spreading-material container a spreading-material volume that is variable through filling and emptying of the at least one liquid tank. When the liquid tank is empty, substantially the total volume of the spreading-material container can be utilized for solid spreading materials.

The employment of a spreading-material container having a horizontal or almost horizontal floor surface instead of a funnel-shaped spreading-material container enables optimal utilization of the available volume of the spreader, which can be placed for example on a truck loading surface. On the one hand, substantially the total volume of the spreading-material container can be utilized for solid spreading materials for pure dry-salt spreading when the liquid tank has been emptied. Thus, more solid spreading material can be received in the spreading-material container than in a funnel-shaped container. This is possible since an inclined sliding surface can be formed by filling the at least one liquid tank with air. That is to say, while solid spreading materials are being spread out from the spreading-material container, the liquid tank is gradually inflated and the inclination of the sliding surface changed. This guarantees a complete emptying of the spreading-material container in spite of the horizontal or almost horizontal floor surface of the spreading-material container. On the other hand, wet-salt spreading can be effected when the liquid tank is partly filled with brine and the remaining volume of the spreading-material container is filled up with solid spreading materials. Here, too, an emptying of the solid spreading materials is ensured due to the sliding surface formed by the liquid tank. If the liquid tank collapses due to the successive withdrawal of brine to the extent that the inclination of the sliding surface becomes insufficient, the liquid tank can be filled up with air accordingly again. Pure brine spreading is also possible when the at least one liquid tank is filled to the extent that it occupies approximately the total volume of the spreading-material container.

In every case it is thus possible to optimally utilize the volume of the spreading-material container, which volume can be in particular cuboid or almost cuboid due to the horizontal or almost horizontal floor surface. In particular, it can be utilized substantially completely either only for solid spreading materials or only for brine or else also for solid spreading materials and brine with fully variable volume portions of the spreading-material container respectively substantially of 0-100%. Spreading-material containers having a horizontal or almost horizontal floor surface are moreover cheaper, since their shape with substantially mutually perpendicular side walls is simpler to manufacture than a funnel shape. Also, no exterior additional tanks or connected vent valves are necessary, and less piping, which simplifies the structure of the system as a whole and saves costs. A further advantage results from the fact that the liquid tanks can be replaced cost-efficiently.

A spreading-material container having a horizontal or almost horizontal floor surface is understood to be in particular a spreading-material container whose floor surface has an inclination relative to the horizontal that is so small as to allow no or almost no independent sliding by gravity of solid spreading materials. For example, the floor surface can have in every region an inclination of less than 20° relative to the horizontal. The floor surface can be inclined toward the conveying device as well as away therefrom. Since the inclined sliding surface is formed by the at least one liquid tank and not by the floor surface, a complete emptying of the spreading-material container is nevertheless possible. Further, a cuboid or almost cuboid spreading-material container is understood to be a spreading-material container having a horizontal or almost horizontal floor surface and substantially vertical side walls. The side walls can also have a certain inclination, for example up to no more than 20° relative to the vertical. The shape of the upper side of the spreading-material container is inessential to the invention. The upper side can likewise be configured horizontally or almost horizontally, or else have an arbitrary shape, for example a roof shape allowing precipitation to flow off.

In the spreading-material container there can be provided in particular two liquid tanks which are arranged on or above the floor surface on opposing sides of the conveying device. The conveying device can be arranged in the floor surface of the spreading-material container for example substantially in the middle and running in the longitudinal direction. In this way the inclined sliding surfaces can obtain a funnel shape of the spreading-material volume. The following remarks are thus respectively to be understood in particular also for mutually opposing liquid tanks.

Preferably, the at least one liquid tank is configured to remain within the spreading-material container when in the completely emptied state, while solid spreading materials to be spread out can be simultaneously received in the spreading-material container and spread out by means of the spreader. The volume of the spreading-material container can in this case be utilized for solid spreading materials completely or almost completely, i.e. up to 100%, preferably at least 90%, but at least 80%. The liquid tank thus need not be taken out of the spreading-material container when pure dry-salt spreading is to be effected. This is promoted in particular by the flexible sheath of the liquid tank, which enables the liquid tank to collapse or fold up. Furthermore, the liquid tank can have a plate or fixed frame or comprise a stiff material on its side facing the spreading-material container wall, so as to guarantee that the liquid tank adjoins the spreading-material container wall when folding up or collapsing and accordingly does not block the conveying device on the bottom of the spreading-material container in the emptied state.

If the inclined sliding surface is formed by the liquid tank itself, its flexible sheath can cause creasing to occur upon an only partial filling of the liquid tank. In particular when the liquid tank collapses during emptying, creases can arise in which solid spreading materials located in the spreading-material container settle, thereby impeding the emptying of the spreading-material container. Hence, it is advantageous to provide at least one movable plate to form the sliding surface. The at least one movable plate is preferably so arranged in the spreading-material container, or can be so arranged in the spreading-material container, that the at least one liquid tank is located between the floor surface and/or a side surface of the spreading-material container and the at least one movable plate. The inclined sliding surface is thus formed at least partly by a surface of the at least one movable plate. The liquid-tank surface which can tend to crease is covered by the at least one movable plate. The plate is movable, so as to retain the variability of the volume of the liquid tank through changing of the liquid-tank filling. The position of the at least one movable plate thus depends on the fill quantity of the liquid tank, in particular when the plates are not moved actively, for example by electric motor, pneumatically or hydraulically, but are freely movable and rest on the at least one liquid tank due to gravity. It is also possible, however, to move the at least one movable plate actively, in which case corresponding actuators and a corresponding control means are to be provided.

Preferably, the at least one movable plate is connected in an articulated manner to the spreading-material container such that solid spreading materials received in the spreading-material container slide by gravity along the inclined sliding surface to the conveying device in the floor surface of the spreading-material container. However, the at least one movable plate can alternatively or additionally also be firmly connected to the liquid tank. Through a preferably rigid plate as part of the spreading-material container and/or of the liquid tank, a smooth sliding surface is present at all times so as to facilitate a sliding of the solid spreading material along the sliding surface.

In a preferred embodiment of the invention, at least two movable plates are provided. At least one of the movable plates is arranged in an upper region of the spreading-material container so as to swivel around a horizontal rotation axis, and at least one further one of the movable plates is arranged so as to swivel around a rotation axis parallel thereto in a lower region of the spreading-material container. Through the provision of two cooperating movable plates, the volume of the liquid tank can be enlarged in comparison to an embodiment with only one movable plate, since a quadrangular cross-sectional shape of the liquid tank can be obtained. If only one plate is provided, it must necessarily be configured relatively long so as to form a sufficiently long sliding surface. Due to the limited volume of the spreading-material container, however, this restricts the swivel angle of the plate. If at least two plates are provided, they can be shorter and accordingly be swiveled further. It is advantageous here when the plate linked in the upper region overlaps the plate linked in the lower region and lies above the plate linked below so as to keep solid spreading materials from passing between and under the plates. For this purpose there can for example also be provided a seal, such as a sealing blanket, between the two plates.

Further preferably, there can also be provided at least two movable plates that are interconnected in an articulated manner. This further increases the variability of the volume of the liquid tank and of the spreading-material container. For example, there can be provided three movable plates, one being arranged in a lower region of the spreading-material container so as to swivel around a horizontal rotation axis, and a second plate being arranged in an upper region of the spreading-material container so as to swivel around a rotation axis parallel thereto, the third plate being attachable in an articulated manner to the free end of the upper plate. This makes it possible to enclose with the plates a volume having a pentagonal cross section for the liquid tank.

Preferably, a plurality of movable plates are configured such that they can jointly enclose a cuboid or prism-shaped volume portion of the volume of the spreading-material container in which the liquid tank is housed. A prism shape, in particular a triangular, quadrangular or pentagonal prism, can be obtained for example by a multi-part plate or by a plurality of plates interconnected in an articulated manner which are connected to the spreading-material container in an accordingly articulated manner. For forming a cuboid shape, two movable plates are required. By a corresponding choice of the plates, in particular their shape, dimensions and connections to the spreading-material container, liquid tank and/or to each other, there can thus be obtained a high variability of the spreading-material volume and of the liquid volume.

Preferably, the at least one movable plate is sealed against the spreading-material container so as to prevent spreading materials received in the spreading-material container from passing onto a side of the movable plate that faces away from the sliding surface. A seal against the corresponding side walls of the spreading-material container is expedient in particular on edges of the plates that border on the rotation axes, in order that the spreading materials do not pass under the movable plates, which would necessitate elaborate cleaning, since spreading materials that have passed under the plates cannot be captured by the conveying device and conveyed out of the spreading-material container. The seal can be effected through corresponding seals, for example sealing lips, which slide along the corresponding side wall of the spreading-material container upon a motion of the plates.

In a preferred embodiment of the invention, the liquid tank has arranged therein an expandable apparatus which advantageously consists at least partly of an elastic material, so that the expandable apparatus can expand in a balloon-like manner. In this way it is possible to maintain the inclined sliding surface even when no or only little liquid is received in the liquid tank. The expandable apparatus is for this purpose preferably arranged in the liquid tank in a lower region, in particular near the floor surface of the spreading-material container, and can be configured as an inflatable sack or balloon.

In particular, the volume of the liquid tank as a whole can be maintained even during the emptying of the liquid tank by expanding the expandable apparatus to the same extent as liquid is withdrawn from the liquid tank. When the liquid received in the liquid tank is always held in the upper region of the liquid tank, the liquid tank can advantageously be emptied without the use of a pump only by utilizing hydrostatic forces and, where applicable, a regulating valve, whereby for this purpose the connection for emptying the liquid tank is located in its upper region. This is advantageous at least in spreading operations that require no pressure for applying the liquid. The same effect can also be achieved when the volume withdrawn from the liquid tank is compensated by air which is pumped into the liquid tank upon emptying of the liquid tank. For this purpose, a pressure valve is advantageous in both cases in order to enable a pressure to be built up in the liquid tank or in the expandable apparatus.

According to a particularly preferred embodiment of the invention, the liquid tank consists of an elastic material, in particular a latex, which, upon filling, stretches and adapts to the shape of the spreading-material container. In the emptied state the tank sack then occupies particularly little room. The elastic stretchability of the material as intended by the invention amounts to more than 20%, preferably more than 50% and particularly preferably more than 100%. The liquid tank can thus expand in a balloon-like manner in this preferred embodiment.

The system according to the invention enables a simple emptying of the spreading-material container, since spreading materials received in the spreading-material container can slide along the sliding surface in the direction of the conveying device. To enable emptying even when the spreading materials have become stuck, the at least one liquid tank and/or, where applicable, the expandable apparatus can be at least partly filled and emptied in a pulsating manner so as to loosen spreading materials received in the spreading-material container. Such filling can be effected either with air, in particular compressed air. When an expandable apparatus, such as an inflatable balloon, is provided in the liquid tank, for example compressed air can be pumped into the balloon and let out again in a pulsating manner. Spreading materials received in the spreading-material container can be loosened in this way so as to prevent for example a tunnel or bridge from forming or—if one has already come about—to dissolve it. This problem occurs when the conveying device on the floor of the spreading-material container conveys spreading materials away and no spreading materials follow.

It can also be advantageous to heat the spreading materials to be spread out before spreading them out on the road in order to improve their adhesion to ice and their thawing effect. For this purpose, spreading materials received in the spreading-material container can be heated by at least partly filling the at least one liquid tank with a heated fluid before the emptying of the spreading-material container. For example, the brine can be heated before being filled into the liquid tanks, thereby simultaneously heating the solid spreading materials, since the liquid tank is located in the spreading-material container. It is advantageous to heat the brine by means of a continuous-flow heater upon application to the road, since this can guarantee that the brine has a desired temperature upon application. If the brine is only heated before or during filling, the heated brine can cool down in the course of time due to the lack of heat insulation of the tank.

BRIEF DESCRIPTION OF THE DRAWINGS

Hereinafter the invention will be explained by way of example with reference to the accompanying drawings. Therein are shown:

FIG. 1 a spreader according to the invention in a perspective view with two partly filled tank sacks, FIG. 2*a* a schematic sectional representation of a first exemplary embodiment of a spreader, FIG. 2*b* a schematic sectional representation of the first exemplary embodiment of the spreader with completely emptied tank sacks, FIG. 2*c* a schematic sectional representation of the first exemplary embodiment of the spreader with completely filled tank sacks, FIGS. 3*a* to 3*c* a schematic sectional representation of a second embodiment of a spreader at different fill levels, FIGS. 4*a* to 4*c* a schematic sectional representation of a third embodiment of a spreader at different fill levels, FIGS. 5*a* to 5*c* a schematic sectional representation of a fourth embodiment of a spreader at different fill levels, FIG. 6 a schematic sectional representation of a fifth exemplary embodiment of a spreader, FIG. 7 a schematic sectional representation of a sixth exemplary embodiment of a spreader, FIG. 8 a schematic sectional representation of a seventh exemplary embodiment of a spreader, FIG. 9 a prior-art spreader in a perspective view with two filled tank sacks, and FIG. 10 the spreader from FIG. 5 with emptied tank sacks.

DETAILED DESCRIPTION

Figure 9:
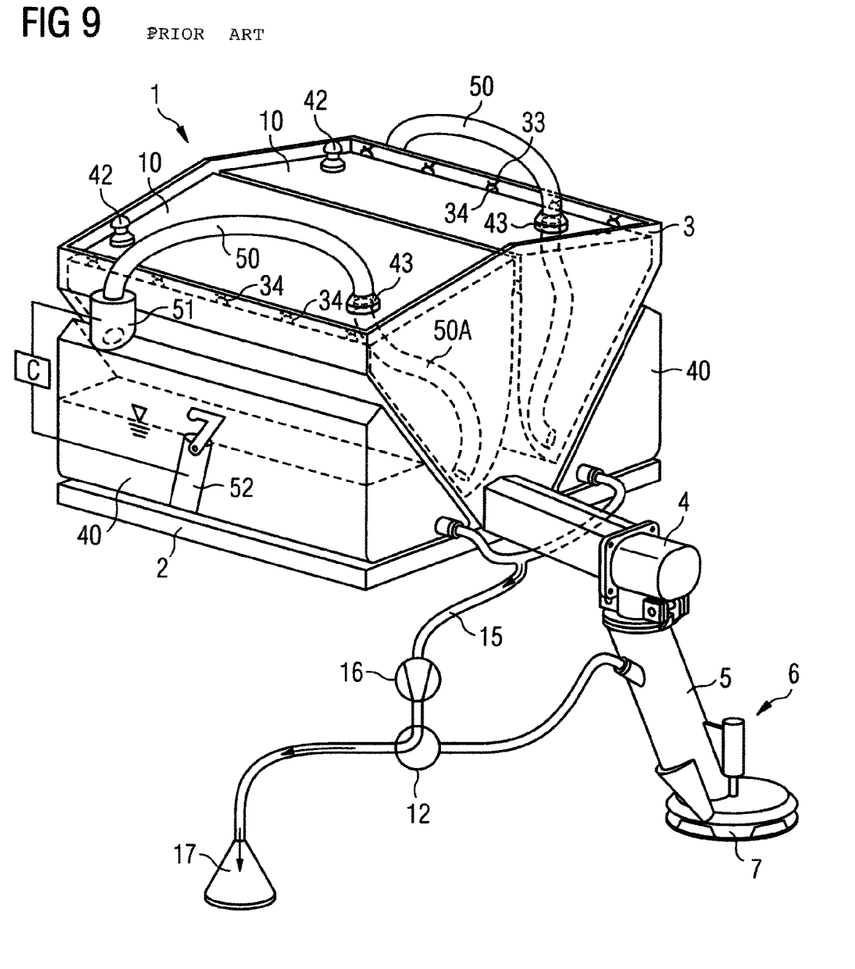
Figure 10:
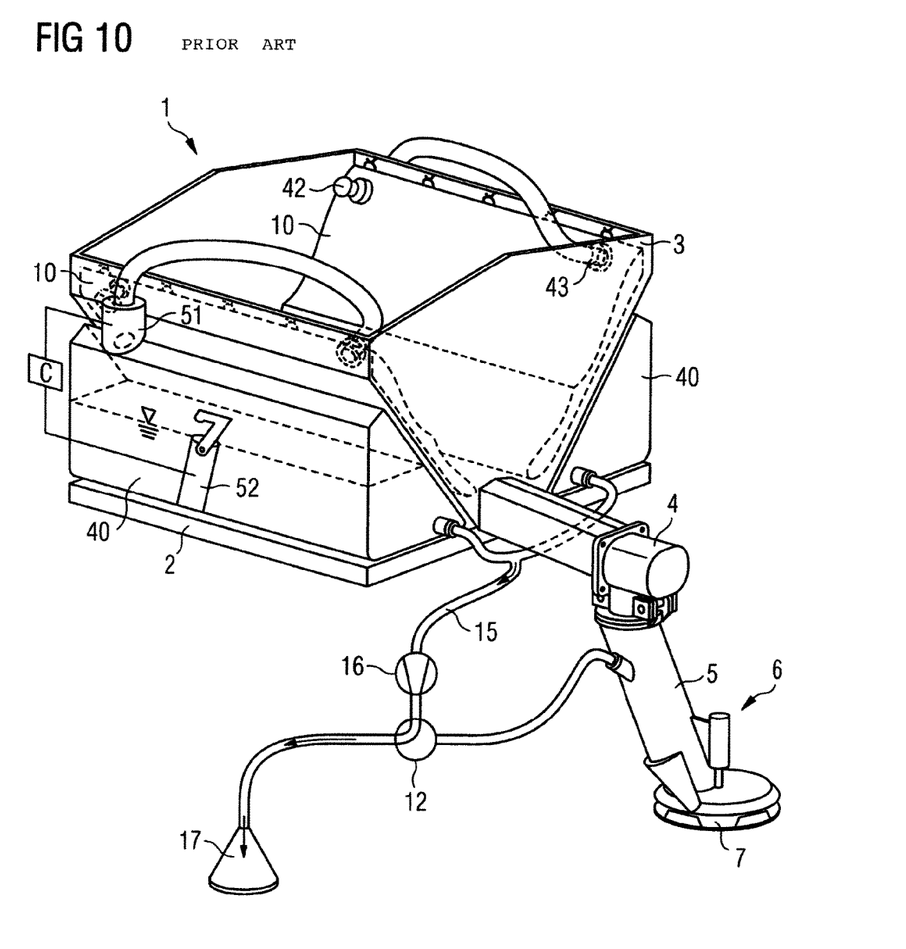

FIGS. 9 and 10 show an attachable spreader 1 known from the prior art, as a superstructure on a loading surface of a truck, which is not explicitly represented here. A spreading-material container 3 is superstructed on a welded support frame 2. A screw conveyor (not represented in FIGS. 9 and 10) on the bottom of the spreading-material container 3 transports solid spreading materials, in particular spreading salt, out of the spreading-material container 3 to an outlet 4 through which the spreading materials can in turn fall by gravity into the downpipe 5 of a spreading device 6 and through the downpipe 5 onto a spreading disk 7 of the spreading device 6.

The known spreading-material container 3 has a funnel-shaped cross section, so that spreading materials received in the spreading-material container 3 collect on the conically converging bottom of the spreading-material container 3. Two additional tanks 40 for liquid, in particular for a salt solution (brine), are provided for admixing liquid in a suitably metered quantity to the dry spreading materials falling through the downpipe 5. This is effected in a per se known manner via a suction line 15 while employing an accordingly actuated pump 16. The place of admixture need not necessarily lie in the downpipe 5 itself, but can for example also be effected only at the lower end of the downpipe 5 on the spreading disk 7.

To increase the brine intake capacity of the spreader 1, two liquid tanks 10 are inserted in the spreading-material container 3 and respectively connected to the additional tanks 40 via a liquid line 50. The liquid tanks 10 can be filled with brine via filling ports 42. In addition to the filling ports 42 there are provided lead-through ports 43 through which the liquid lines 50 are guided into the respective liquid tank 40 with a tube extension 50A. The tube extension 50A reaches to the bottom of the liquid tank 10. Thus the liquid tank 10 can be emptied completely through the liquid line 50 and the brine be supplied to the additional tanks 40. This is done using a suction pump 51 which can receive signals from a float 52 about the fill level of the additional tanks 40. Alternatively, the liquid tank 10 can also be emptied without employing a suction pump, for example by utilizing hydrostatic forces.

The liquid tanks 10 are respectively formed by a tank sack which—as described—is inserted into the spreading-material container 3. The tank sack 10 consists of a flexible material, so that its inner volume can be adapted accordingly upon filling and emptying of the tank sack with liquid.

In FIG. 9 the two tank sacks 10 are represented in the filled state. The filling port 42 is closed, preferably sealed airtight. When the tank sack 10 as a whole is sealed airtight, this has the consequence that upon emptying of the tank sack 10 there arises a negative pressure in the tank sack 10, which causes the tank sack 10 to collapse. If the tank sack 10 is configured suitably, the tank sack 10 will fold up or collapse independently during this process. This state of the folded up tank sack 40 is represented in FIG. 10.

To enable a collapsing or folding up, the tank sacks 10 are fastened accordingly to the spreading-material container 3. The fastening 33, 34 can be such that the tank sacks 10 are removable from the spreading-material container 3 if they are not needed for some time. A permanent mounting of the tank sacks 10 in the spreading-material container 3 is also possible.

The functions of pure brine spreading, dry-salt spreading or wet-salt spreading can be obtained with the pump 16 and suitable valves 12. By means of the valve 12 (for example ball valve) configured as a three-way cock, the pump 16 can be connected to the spraying device 17 or to the downpipe 5 to switch between pure brine spreading and wet-salt spreading. If dry salt is to be spread, i.e. without the admixture of brine from the additional tanks 10, either the pump 16 can be switched off or the three-way cock 12 can be swiveled so as to interrupt the route from the pump 16 to both the spraying device 17 and the spreading device 6. On the other hand, it is also possible with the position of the three-way cock 12 represented in FIG. 9 to spread dry salt by means of the spreading device 6 as well as pure brine by means of the spraying device 17. Through suitable modification of the system, for example through different or additional way valves and/or additional lines and/or line branches and/or through one or more further pumps, it can also be guaranteed that simultaneously pure brine is spread via the spraying device 17 and wet salt via the spreading device 6.

A disadvantage of the known spreader is, as mentioned at the outset, the complex structure requiring a great number of conduits. Moreover, the volume of the spreader cannot be optimally utilized, in particular if the spreader is to be employed alternately for the different functions of pure brine spreading, dry-salt spreading and wet-salt spreading. The additional tanks 40 are firmly installed and must also be carried if no brine is required. The additional tanks 40 are unsuitable for solid spreading materials. The necessary funnel shape, which enables a sliding by gravity of the solid spreading materials onto the screw conveyor, causes the spreading-material volume to be further limited by the sloping floor surfaces.

Figure 1:
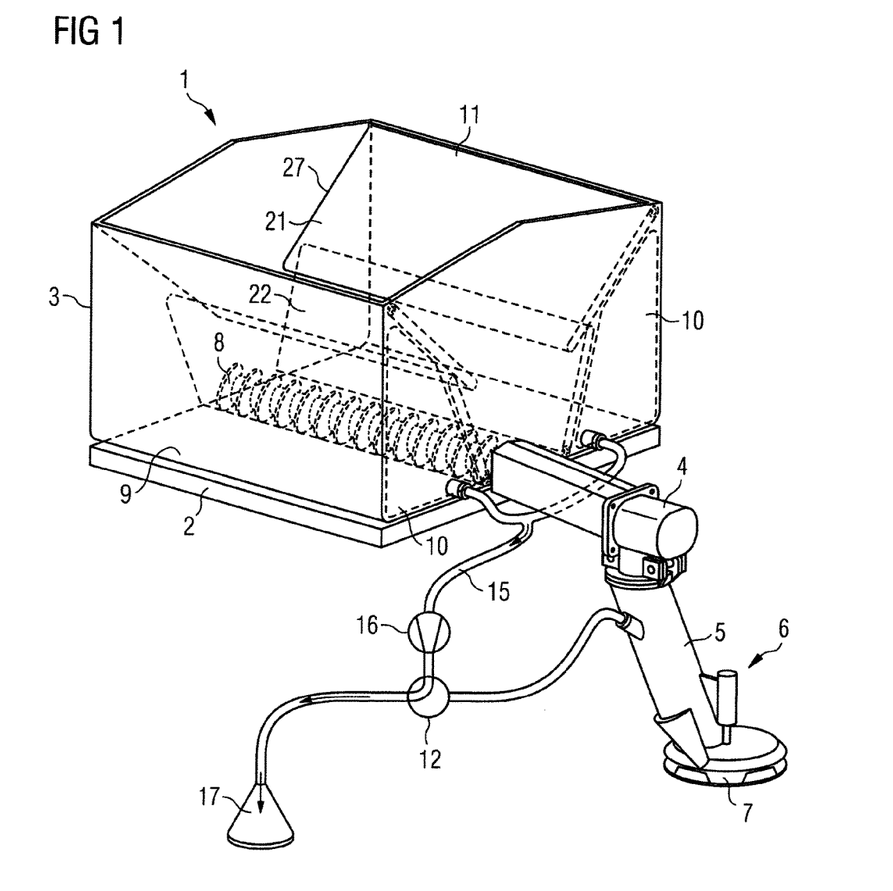

Hence, it is provided according to the invention, as represented in FIG. 1, that the spreading-material container 3 has a horizontal floor surface 9 in which the conveying device 8 is arranged. In this embodiment, the side walls of the spreading-material container 3 are configured to be substantially vertical, resulting in a cuboid volume, disregarding the inclined roof of the spreading-material container 3. Within the spreading-material container 3 there are arranged the liquid tanks 10 in the form of flexible tank sacks for receiving brine. They are adapted to the horizontal floor surface 9 of the spreading-material container 3, so that no outwardly attached additional tanks 40 are necessary, in contrast to the known spreader. The liquid tanks 10 moreover serve to provide an inclined sliding surface 11 for the solid spreading materials, since otherwise no complete emptying of the spreading-material container 3 would be possible due to the horizontal floor surface 9. The sliding surface 11 is formed in the embodiment according to FIG. 1 (see also FIG. 6) by movable plates 21, 22 which are sealed at their edges by means of a seal 27 against the side walls of the spreading-material container 3 so as to prevent solid spreading materials from passing under the plates 21, 22. Otherwise, the spreader corresponds in its structure and in particular its manner of functioning to the prior-art spreader described in detail according to FIGS. 9 and 10.

The system according to the invention has high variability, since the spreading-material container 3 can firstly be filled almost completely with solid spreading materials for pure dry-salt spreading when the tank sacks 10 are empty, or secondly a filling of both the tank sacks 10 and the spreading-material container 3 can be effected for wet-salt spreading, or thirdly it is also possible to fill the tank sacks 10 completely for pure brine spreading. It is possible to install the tank sacks 10 firmly in the spreading-material container 3 or to configure them as separate elements, so that the tank sacks 10 can be withdrawn from the spreading-material container 3 and replaced, where applicable. The manner of functioning otherwise corresponds to that of the known spreader 1 described in connection with FIGS. 9 and 10.

Figure 2A:
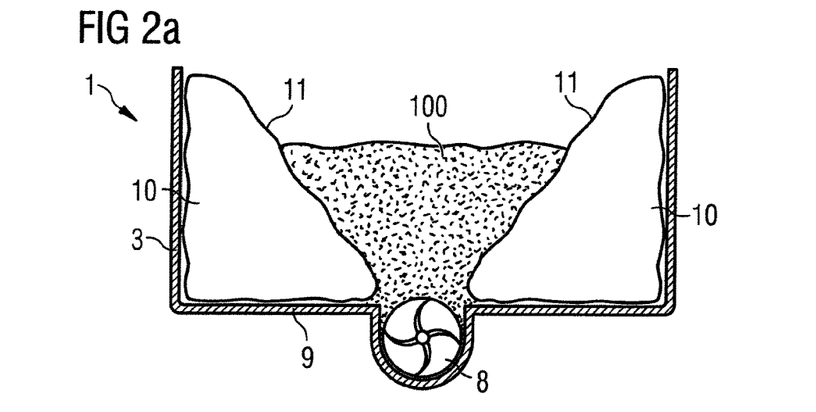

In FIGS. 2a to 8 there are schematically represented different embodiments and operating states of the spreader 1. FIG. 2a shows an embodiment of a spreader 1 having a spreading-material container 3 and a screw conveyor 8 in a horizontal floor surface 9 of the spreading-material container 3, with two tank sacks 10 being received in the spreading-material container 3. The tank sacks 10 are partly filled with brine and form sliding surfaces 11, inclined toward a screw conveyor 8, for the solid spreading materials to be applied, such as spreading salt 100. The tank sacks 10 have an at least partly flexible sheath, which collapses during its emptying.

Figure 2B:
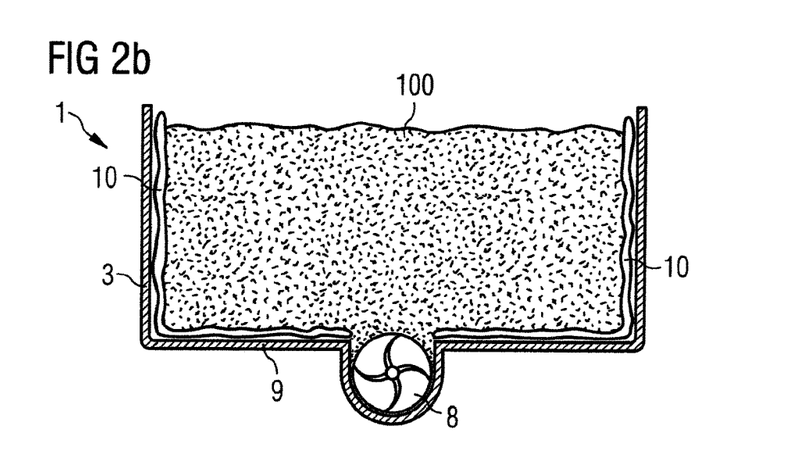
Figure 2C:
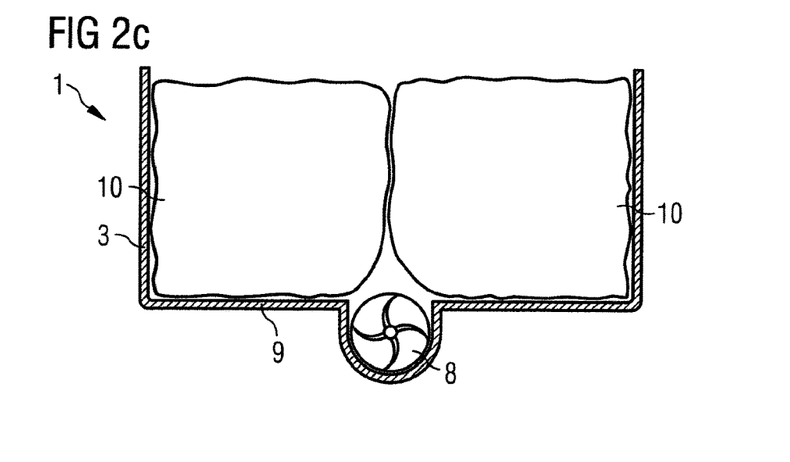

When the tank sacks 10 are empty, the complete volume of the spreading-material container 3 can be employed as the spreading-material volume for the spreading salt 100, as represented in FIG. 2b. On the other hand, the tank sacks 10 can also be filled completely with brine, so that the volume of the spreading-material container 3 can be employed completely or almost completely for brine, as represented in FIG. 2c. For this purpose, the tank sacks 10 can be configured to be elastic or at least partly elastic. The tank sacks 10 can, for stability reasons, have a stiff floor and/or a stiff back wall pointing toward the side wall of the spreading-material container 3. If the tank sacks 10 are configured to be completely inelastic, they can for example be cuboid or have a triangular cross section. If the tank sacks 10 are completely flexible, it is advantageous to provide a corresponding fastening to the spreading-material container 3, for example in the form of hooks and eyes or a curtain rail. The tank sacks 10 are in any case so configured as not to collide with the screw conveyor 8. The tank sacks 10 can for this purpose be fixed in proximity to the screw conveyor 8 on the floor of the spreading-material container 3. On the sides of the spreading-material container 3 the tank sacks 10 can be displaceable in the vertical direction or alternatively fixed stationarily in the upper region, depending on the desired application. The tank sacks 10 can also be provided in the spreading-material container 3 without stationary fixation.

Figure 3A:
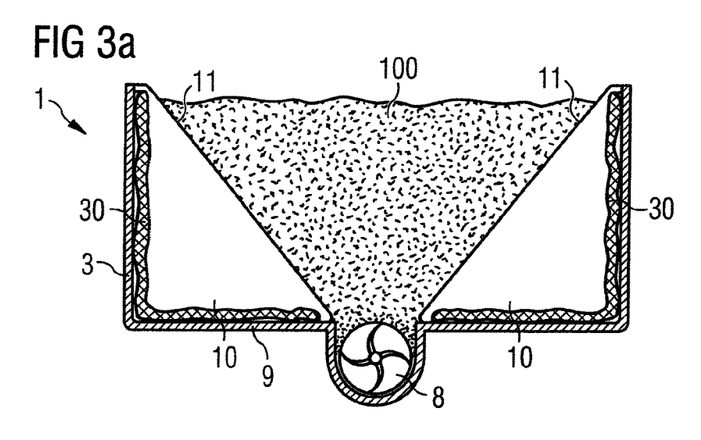

In FIGS. 3a to 5c there are represented embodiments of spreaders respectively having inside the tank sacks 10 an expandable apparatus in the form of an inflatable sack or balloon. Such "sack in sack" systems are suitable for different applications. FIGS. 3a to 3c show a spreader for wet-salt spreading, FIGS. 4a to 4c a spreader for dry-salt spreading, and FIGS. 5a to 5c a spreader for pure brine spreading. The inflatable sacks 30 respectively consist of a stretchable material in order to be inflatable with air, whereas the tank sacks 10 preferably respectively consist of a non-stretchable material so as not to impair the formation of a sliding surface 11.

In FIG. 3a there is represented a spreader 1 for wet-salt spreading, wherein the tank sacks 10 are filled completely with brine, and the volume above the tank sacks 10 is filled with spreading salt 100. The tank sacks 10 form inclined sliding surfaces 11 on which the spreading salt 100 can slide in the direction of the screw conveyor 8. The formation of the sliding surfaces 11 can be supported by fastening the tank sacks 10 in the spreading-material container 3, for example clamping them between the floor surface 9 and the respective bordering side wall of the spreading-material container 3. The tank sacks 10 can for this purpose be fixed near the screw conveyor 8 on the floor of the spreading-material container 3 and in the upper region of the side walls of the spreading-material container 3. At the fill level represented in FIG. 3a, the sacks 30 are empty.

Figure 3B:
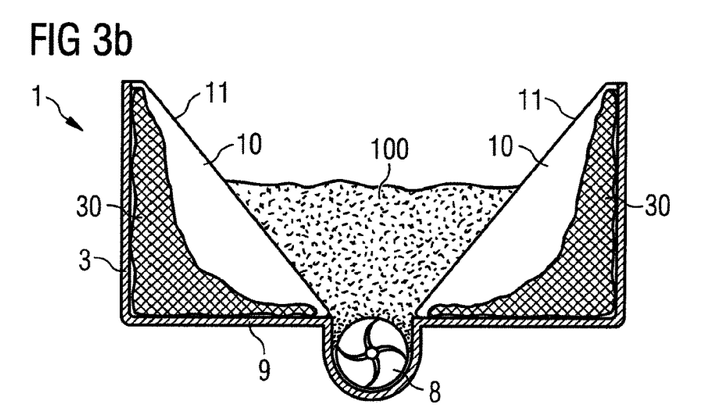
Figure 3C:
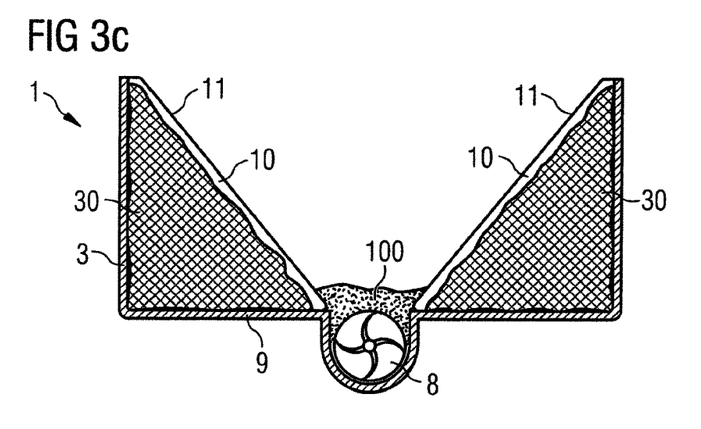

To prevent the tank sacks 10 and thus the sliding surfaces 11 from collapsing, the sacks 30 are accordingly filled with air upon emptying of the tank sacks 11, as represented in FIGS. 3b and 3c. The supplied air volume in the sacks 30 compensates the brine volume withdrawn from the tank sacks 10. Simultaneously the brine in the tank sacks 10 is urged upward, so as to facilitate an emptying through an upper opening (not represented). As likewise to be recognized in FIGS. 3b and 3c, the spreading salt 100 can slide along the sliding surfaces 11 in the direction of the screw conveyor 8. FIG. 3c finally shows the completely emptied state of the spreader 1, with the inflatable sacks 30 now being filled to the maximum.

Figure 4A:
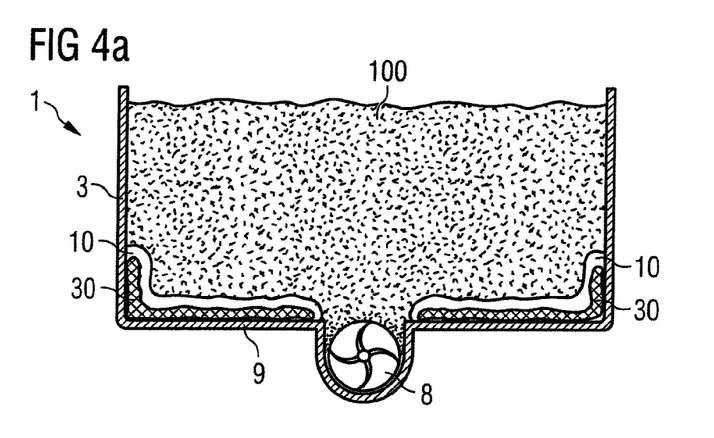
Figure 4B:
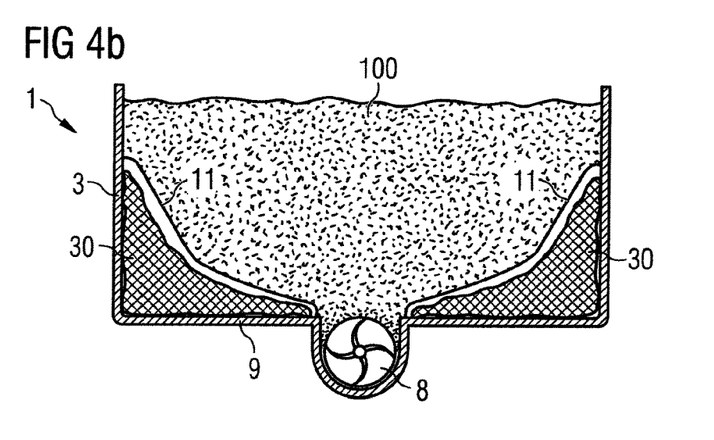
Figure 4C:
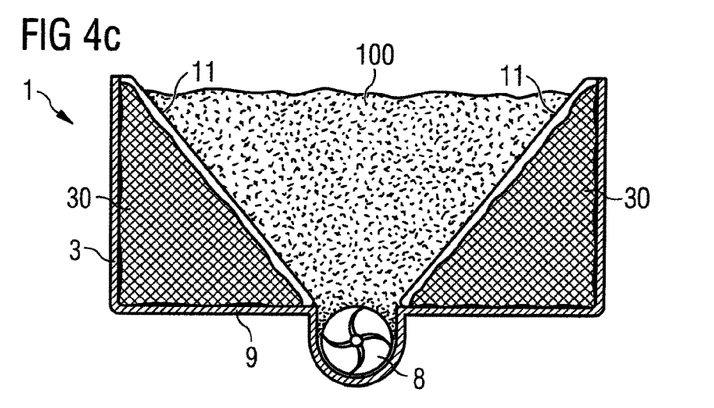

In FIGS. 4a to 4c there is represented an embodiment of a spreader 1 for pure dry-salt spreading. Hence, the tank sacks 10 are always empty in this embodiment. To facilitate a maximum filling of the spreading-material container 3 with spreading salt 100, the tank sacks 10 are mounted displaceably in the vertical direction along the side walls of the spreading-material container 3 (in contrast to the embodiments represented in FIGS. 2 and 3). Upon emptying of the spreading-material container 3, the inflatable sacks 30 are filled with air, so that the tank sacks 10 rise and the inclined sliding surfaces 11 thereby form. In so doing, the sacks 30 occupy the volume of the empty tank sacks 10. Since the tank sacks 10 are mounted displaceably on the side walls, they can be moved upward through inflation of the sacks 30, as represented in FIGS. 4b and 4c. Additionally, it may be required, where applicable, to pull the tank sacks 10 upward in the corners of the spreading-material container 3. As soon as the inclined sliding surfaces 11 have completely formed, as represented in FIG. 4c, the spreading salt can slide along the sliding surfaces 11 in the direction of the screw conveyor 8, analogously to FIGS. 3a to 3c.

Figure 5A:
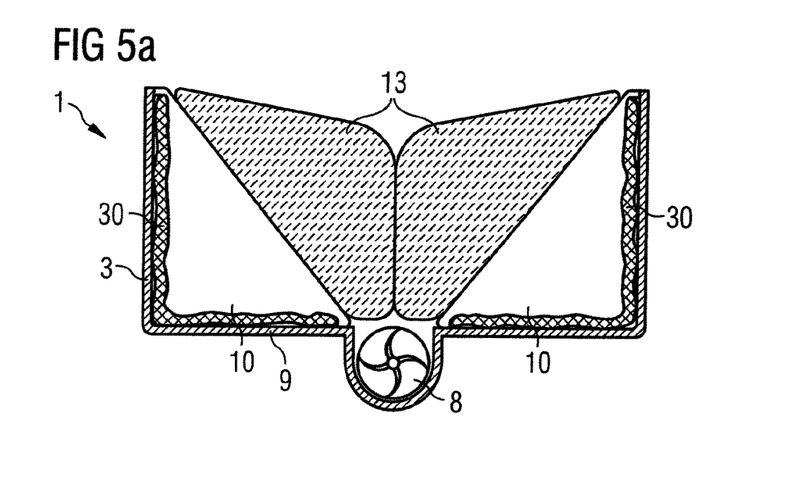
Figure 5B:
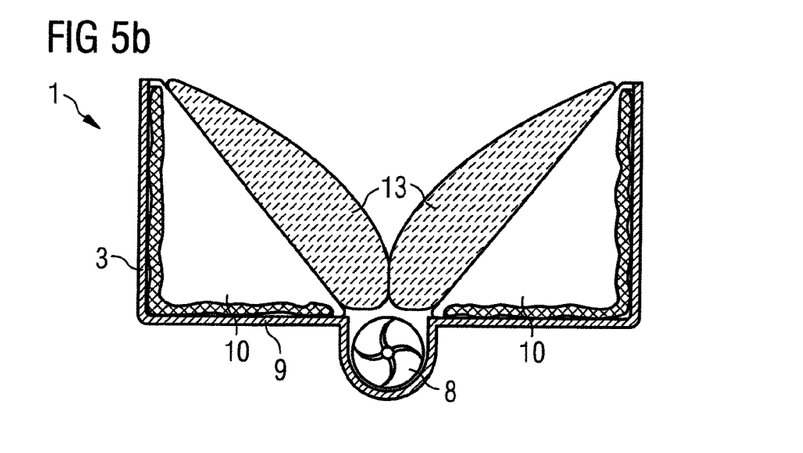
Figure 5C:
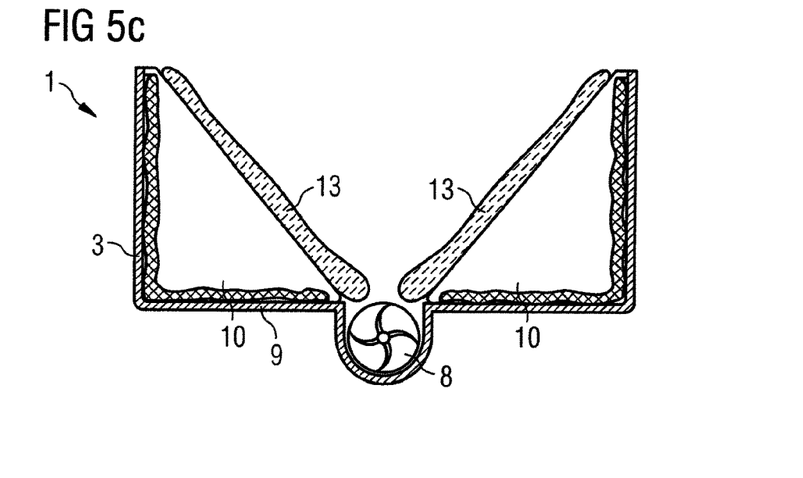

In FIGS. 5a to 5c there is represented an embodiment of a spreader 1 for pure brine spreading. To enable the volume of the spreading-material container 3 to be fully utilized, additional tank sacks 13 are hence provided. In order that they occupy as small a volume as possible in the empty state (FIG. 5c), they are preferably made of a stretchable material. The additional tank sacks 13 can be emptied before or after the tank sacks 10 or also simultaneously. The emptying of the tank sacks 10 can be effected in the same way as in connection with FIGS. 3a to 3c upon simultaneous filling of the inflatable sacks 30 with air. However, a filling of the sacks 30 with air is not necessarily required in this embodiment, since no sliding surfaces for solid spreading materials have to be formed.

In the above-described simple embodiment, however, creases can form during emptying upon the collapsing of the tank sacks 10, in which creases the spreading salt 100 can settle. This can impede the emptying of the spreading-material container 3. Hence, in the further embodiments according to FIGS. 6, 7 and 8 there are provided movable plates 21, 22, 23 which form the sliding surface 11. The movable plates 21, 22, 23 respectively enclose a part of the volume of the spreading-material container 3 in which one of the tank sacks 10 is located. Thus, a smooth sliding surface 11 is given at every fill level of the tank sacks 10.

Figure 6:
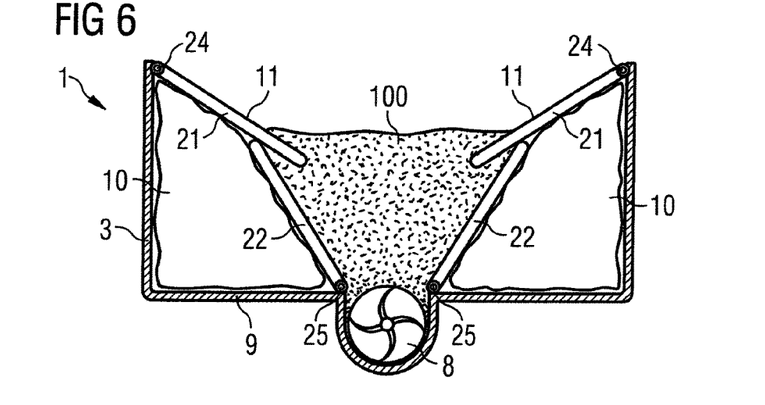
Figure 7:
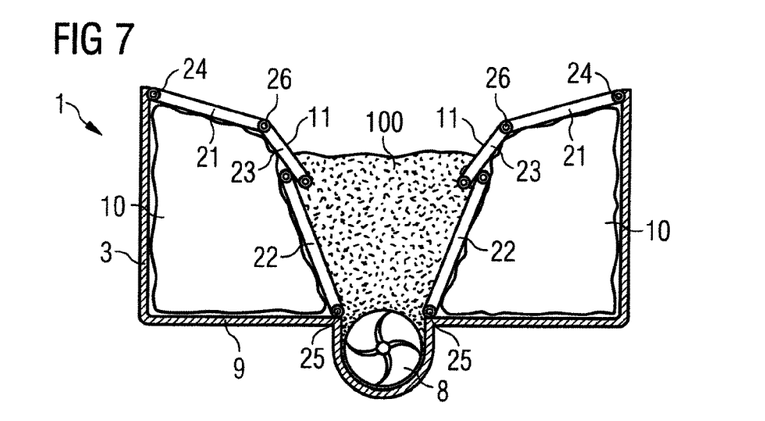

In the embodiment represented in FIG. 6, there are provided for each tank sack 10 a respective pair of movable plates 21, 22 which are connected in a swivelable manner to the spreading-material container 3. The upper plates 21 are connected to the spreading-material container 3 on rotation axes 24 in the upper region, while the lower plates 22 are connected to the spreading-material container 3 on rotation axes 25 in the lower region. To prevent the spreading salt 100 from passing through between the plates 21, 22 and under the plates 21, 22, a seal, for example a blanket (not represented), can be attached at the free end of the upper plates 21. It is also possible to connect the plates 21, 22 firmly to the tank sacks 10, in particular if the tank sacks 10 are removable from the spreading-material container, in which case the plates 21, 22 are accordingly swivel-mounted upon insertion of the tank sacks 10 into the spreading-material container 3. The same applies to the embodiment represented in FIG. 7, in which a further plate 23 is respectively attached to the upper plates 21. The plates 26 are respectively connected to the upper plates 21 so as to swivel around a rotation axis 26. The plates 21, 22, 23 can thus be configured shorter in comparison to the embodiment from FIG. 6.

Figure 8:
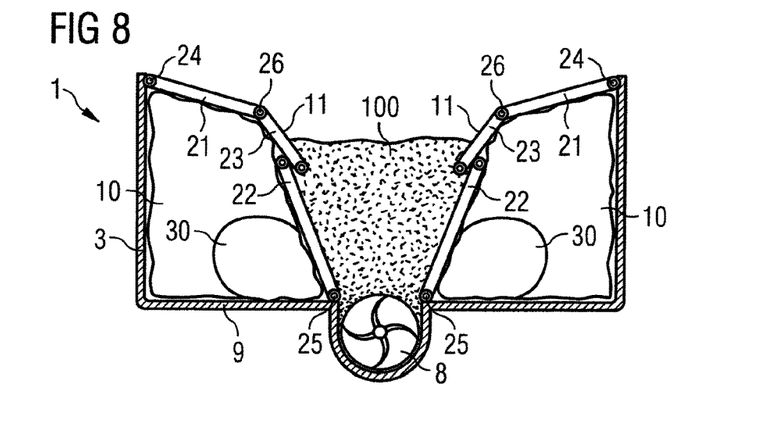

FIG. 8 shows an embodiment in which an expandable apparatus in the form of an inflatable balloon 30 is respectively arranged within the tank sacks 10. This embodiment otherwise corresponds to the embodiment represented in FIG. 7, it being appreciated that the inflatable balloon 30 can also be provided in the other embodiments, as described in particular in connection with FIGS. 3a to 5c. The inflatable balloon 30 serves to raise the sliding surfaces 11, which are formed either by the tank sacks 10 themselves or by the movable plates 21, 22, 23, when the fill level in the tank sacks 10 is so low that the sliding surfaces 11 become too flat and the spreading salt 100 would no longer slide by gravity along the sliding surfaces 11. Upon wet-salt spreading, the shrinking volume can be compensated by inflating the balloons 30 during the emptying of the tank sacks 10, so that the inclination of the sliding surfaces 11 remains substantially constant throughout the spreading process. This can be effected for example through compressed air, which is pumped into the balloons 30. Upon pure dry-salt spreading, it is necessary for complete emptying of the spreading-material container 3 to raise the sliding surfaces 11 from a certain time on, in order that the entire spreading salt 100 can slide in the direction of the screw conveyor 8. However, the balloons 30 can also be used for loosening the spreading salt 100 if it has become stuck. For example, it can happen that a tunnel forms above the screw conveyor 8 through the carrying off of the spreading salt 100, when the spreading salt is too firm or tends to form lumps. To remedy this or already avoid it beforehand, the balloons 30 can be filled with compressed air and emptied again in a pulsating manner so as to obtain a loosening of the spreading salt 100.

Further alternative embodiments of the invention are possible, in particular through combination of individual features of the hereinabove described embodiments. For example, the spreading-material container can be subdivided longitudinally as well as transversely and receive for example four laterally mounted tank sacks. Moreover, it is possible to fill the tank sacks with air in the course of their emptying, instead of accordingly inflating balloons received therein.

The invention claimed is:
1. A spreader, for service vehicles, for spreading out solid spreading materials, comprising:
   a spreading-material container for receiving the solid spreading materials to be spread out, and a conveying device in a floor surface of the spreading-material container for conveying the spreading materials out of the spreading-material container, and further comprising at least one liquid tank arranged within the spreading-material container laterally to the conveying device and having an at least partly flexible sheath and variable volume, wherein the floor surface of the spreading-material container is configured substantially horizontally, and that, when the at least one liquid tank is empty, the spreading-material container is configured to be filled with solid spreading materials to be spread out into a portion of volume of the spreading-material container which corresponds to a total volume of liquid materials contained in the at least one liquid tank when the at least one liquid tank is completely filled, wherein the spreader is configured to spread the solid spreading materials, including all those solid spreading materials present in all areas of the spreading-material container which are otherwise occupied by the at least one liquid tank when it is completely filled and corresponds in volume to said total volume of liquid materials, out of the spreading-material container by means of the conveying device, wherein the at least one liquid tank is arranged on or above the floor surface such that upon an at least partial filling of the liquid tank, a sliding surface inclined toward the conveying device relative to the floor surface exists for the solid spreading materials to be spread out.

2. The spreader according to claim 1, wherein the at least one liquid tank is configured to remain within the spreading-material container when in a completely emptied state, while solid spreading materials to be spread out can be simultaneously received in the spreading-material container and spread out by the spreader.

3. The spreader according to claim 1, further comprising: at least one movable plate which is arranged, in the spreading-material container such that the at least one liquid tank is located between the floor surface and a side surface of the spreading-material container and the at least one movable plate, so that the inclined sliding surface is formed at least partly by a surface of the at least one movable plate, with the at least one movable plate being connected in an articulated manner to the spreading-material container such that an inclination of the plate is changeable.

4. The spreader according to claim 3, wherein at least two of said at least one movable plate are provided and at least one of the movable plates is arranged in an upper region of the spreading-material container to swivel around a horizontal rotation axis, and at least one of the movable plates is arranged to swivel around a rotation axis parallel thereto in a lower region of the spreading-material container.

5. The spreader according to claim 3, further comprising at least two of said at least one movable plate which are interconnected in an articulated manner.

6. The spreader according to claim 3, wherein the at least one movable plate is configured such that it encloses a cuboid or prism-shaped volume portion of the volume of the spreading-material container in which the liquid tank is housed.

7. The spreader according to claim 3, wherein the at least one movable plate is sealed against the spreading-material container to prevent spreading materials received in the spreading-material container from passing onto a side of the movable plate that faces away from the sliding surface.

8. The spreader according to claim 1, wherein the liquid tank has arranged therein an expandable apparatus comprising at least partly of an elastic material, so that the expandable apparatus can expand and contract.

9. The spreader according to claim 1, wherein the liquid tank is made at least partly of an elastic material, so that the liquid tank can expand and contract.

10. A spreading-material container, for winter service vehicles, for receiving solid spreading materials to be spread out, comprising:
  a conveying device in a floor surface of a spreading-material container for conveying spreading materials out of the spreading-material container,
  wherein the floor surface of the spreading-material container is configured substantially horizontally and the conveying device extends within the substantially horizontal floor surface,
  wherein the floor surface is configured such that at least one liquid tank having an at least partly flexible sheath and variable volume can be arranged within the spreading-material container on the floor surface such that upon an at least partial filling of the liquid tank, a sliding surface inclined toward the conveying device relative to the floor surface exists for the solid spreading materials to be spread out, and
  wherein, when the at least one liquid tank is empty, the spreading-material container is configured to be filled with solid spreading materials to be spread out into a portion of volume of the spreading-material container which corresponds to a total volume of liquid materials contained in the at least one liquid tank when the at least one liquid tank is completely filled, wherein the spreader is configured to spread the solid spreading materials, including all those solid spreading materials present in all areas of the spreading-material container which are otherwise occupied by the at least one liquid tank when it is completely filled and corresponds in volume to said total volume of liquid materials, out of the spreading-material container by means of the conveying device.

11. The spreading-material container according to claim 10, comprising:
  at least one movable plate which is connected in an articulated manner to the spreading-material container and, in an inclined position, forms a sliding surface toward the conveying device for spreading materials received in the spreading-material container, wherein the at least one movable plate is sealed against the spreading-material container to prevent spreading materials received in the spreading-material container from passing onto a side of the movable plate that faces away from the sliding surface.

12. The spreading-material container according to claim 10, further comprising a liquid tank, wherein the liquid tank possesses an at least partly flexible sheath and a variable volume, wherein the liquid tank is adapted to be arranged on or above the substantially horizontal floor surface of the spreading-material container and, through at least partial filling, can form within the spreading-material container a sliding surface for solid spreading materials to be spread out that is inclined toward the conveying device relative to the floor surface, with the liquid tank comprising at least one plate which is movably fastened to the liquid tank.

13. The spreading-material container according to claim 12, wherein the liquid tank has arranged therein an expandable apparatus which is made at least partly of an elastic material, so that it can expand and contract.

14. The spreading-material container according to claim 12, wherein the liquid tank comprises, at least partly, of an elastic material, so that it can expand and contract.

* * * * *